(12) United States Patent
Ueyama et al.

(10) Patent No.: US 11,082,575 B2
(45) Date of Patent: Aug. 3, 2021

(54) DOCUMENT READER AND CONTROL METHOD THAT READS DOCUMENT MEDIUM DURING TRANSPORT

(71) Applicant: SEIKO EPSON CORPORATION, Tokyo (JP)

(72) Inventors: Naohiro Ueyama, Matsumoto (JP); Kenichi Tanioka, Matsumoto (JP); Yuta Watanabe, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/988,097

(22) Filed: Aug. 7, 2020

(65) Prior Publication Data
US 2021/0044712 A1    Feb. 11, 2021

(30) Foreign Application Priority Data
Aug. 9, 2019 (JP) .............................. JP2019-147225

(51) Int. Cl.
*H04N 1/00* (2006.01)
(52) U.S. Cl.
CPC ..... *H04N 1/00649* (2013.01); *H04N 1/00588* (2013.01); *H04N 1/00602* (2013.01); *H04N 1/00657* (2013.01); *H04N 1/00665* (2013.01)
(58) Field of Classification Search
CPC ........... H04N 1/00649; H04N 1/00588; H04N 1/00602; H04N 1/00657; H04N 1/00665

USPC .......................................................... 358/498
See application file for complete search history.

(56) References Cited

U.S. PATENT DOCUMENTS

| | | | |
|---|---|---|---|
| 5,267,009 A | 11/1993 | Takada et al. | |
| 10,322,898 B2 * | 6/2019 | Kogi | B65H 7/02 |
| 2003/0202218 A1 * | 10/2003 | Morinaga | H04N 1/00631 358/474 |
| 2018/0154661 A1 * | 6/2018 | Tokai | B41J 11/64 |
| 2019/0104228 A1 * | 4/2019 | Arimori | H04N 1/00602 |
| 2019/0281182 A1 * | 9/2019 | Kanaya | H04N 1/00037 |

FOREIGN PATENT DOCUMENTS

| | | |
|---|---|---|
| JP | H05-006042 | 1/1993 |
| JP | 2005-331820 | 12/2005 |

* cited by examiner

*Primary Examiner* — Gabriel I Garcia
(74) *Attorney, Agent, or Firm* — Workman Nydegger

(57) ABSTRACT

A document reader includes a reading unit that reads an image of a document medium, a second driving roller pair that nips and transports the document medium downstream of a read-enabling position of the reading unit, and a control unit that controls rotation of the second driving roller pair. The control unit stops the rotation of the second driving roller pair in a state in which the document medium is not positioned in the read-enabling position and in a state in which the document medium is nipped by the second driving roller pair.

8 Claims, 6 Drawing Sheets

DOCUMENT READER AND CONTROL METHOD THAT READS DOCUMENT MEDIUM DURING TRANSPORT

The present application is based on, and claims priority from JP Application Serial Number 2019-147225, filed Aug. 9, 2019, the disclosure of which is hereby incorporated by reference herein in its entirety.

BACKGROUND

1. Technical Field

The present disclosure relates to a document reader including a reading unit that reads a document medium during transport, and a control method.

2. Related Art

In related art, a document reader is known that is provided with a transport unit that transports a document medium, and a reading unit that reads the document medium being transported. For example, JP-A-2005-331820 discloses an image forming device provided with an automatic document feed device that transports a document and that includes a reading unit that reads the document being transported. In this image forming device, the document is discharged to a paper discharge tray, and the document is loaded on the paper discharge tray.

In the image forming device disclosed in JP-A-2005-331820, the document discharged onto the paper discharge tray is loaded on the paper discharge tray until removed. If the paper discharge tray is small relative to the size of the document being discharged, the document falls from the paper discharge tray, and there is a risk that the document may be deformed.

SUMMARY

A document reader for solving the above-described problem is a document reader reading an image of a document medium being transported and outputting image data. The document reader includes a reading unit configured to read the image of the document medium, a first roller pair configured to nip and transport the document medium downstream of a read-enabling position of the reading unit on a transport path along which the document medium is transported, and a control unit configured to control a rotation of the first roller pair. The control unit stops, as a document medium holding operation, the rotation of the first roller pair in a state in which the document medium is not positioned in the read-enabling position of the reading unit and in a state in which the document medium is nipped by the first roller pair.

According to this configuration, regardless of the dimensions of the document medium, a risk of falling of the document medium for which the reading is complete can be reduced.

DESCRIPTION OF EXEMPLARY EMBODIMENTS

An embodiment of a document reader will be described below.

The document reader according to the present embodiment is a multifunction machine provided with a printing function, in addition to a reading function that reads an image of a document medium 95, such as a sheet, that is being transported, and outputs image data. In the document reader according to the present embodiment, the printing function is realized by an ink-jet method by ejecting ink, which is an example of a liquid, onto a medium such as a sheet.

Figure 1:
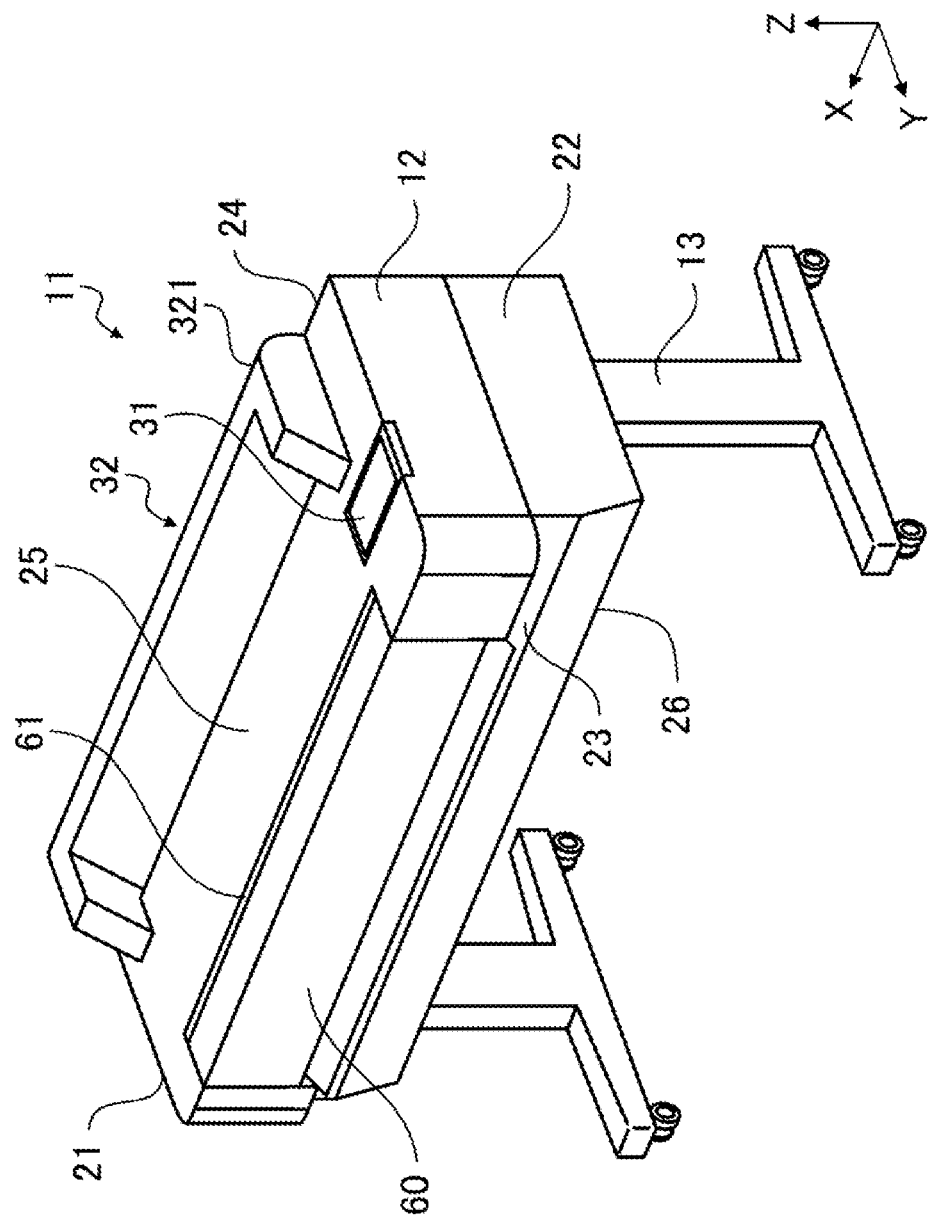
FIG. 1 is a perspective view illustrating a document reader according to an embodiment.
Figure 2:
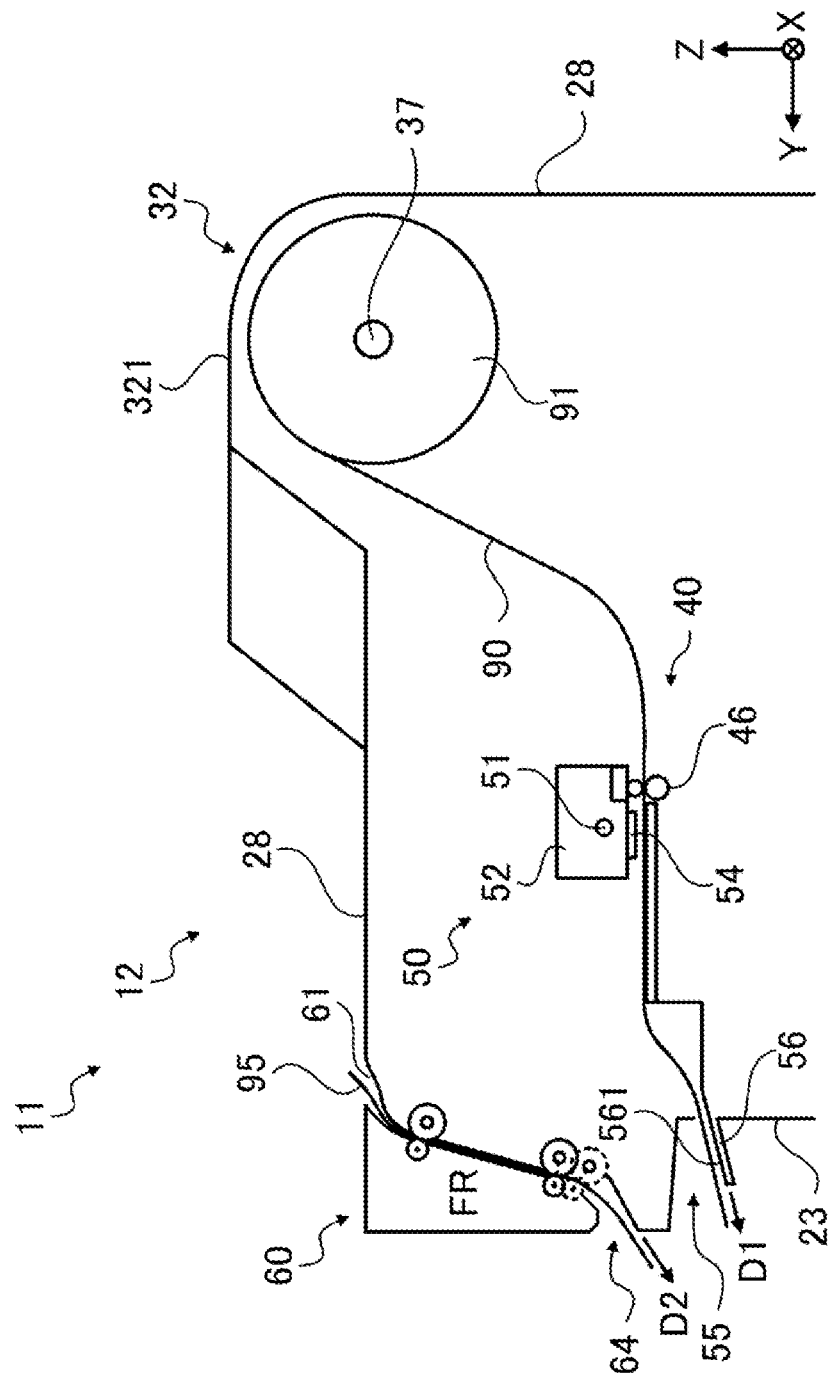
FIG. 2 is a cross-sectional view illustrating the document reader.

As illustrated in FIG. 1 to FIG. 2, a document reader 11 is a printing apparatus provided with a scanner unit 60. The document reader 11 includes a main body 12, and legs 13 supporting the main body 12. The main body 12 has a height, a depth, and a width of predetermined lengths. The document reader 11 is placed on a horizontal plane, and the width direction and depth direction are substantially horizontal. Then, a vertical direction, the depth direction, and the width direction are indicated using a Z axis, a Y axis, and an X axis intersecting the Z axis and the Y axis, respectively. The X axis, the Z axis, and the Y axis are coordinate axes indicating the lengths of the width, height, and depth, respectively.

In the description below, a direction along the X axis indicates the width direction, one direction along the X axis indicates a positive X direction, and the other direction along the X axis indicates a negative X direction. A direction along the Y axis indicates the depth direction, one direction along the Y axis indicates a positive Y direction, and the other direction along the Y axis indicates a negative Y direction. Further, a direction along the Z axis indicates the vertical direction, the vertically downward direction indicates a negative Z direction, and the vertically upward direction indicates a positive Z direction.

In the descriptions below, the terms top, bottom, left, right, front, and rear may be used for ease of explanation. These directions are each of directions as seen by a user when it is assumed that the user is on the positive Y direction side of the document reader 11.

The main body 12 includes a left-side face 21 facing the positive X direction, a right-side face 22 facing the negative X direction, a front face 23 facing the positive Y direction, a rear face 24 facing the negative Y direction, a top face 25 facing the positive Z direction, and a bottom face 26 facing the negative Z direction. The main body 12 has a substantially rectangular cuboid shape.

The main body 12 includes an exterior casing 28. The top face of the exterior casing 28 is flat. The document medium 95 is transported to the interior of the scanner unit 60 via a document feed port 61 located on a front portion of the top face of the exterior casing 28. In the present embodiment, when the user sets the document medium 95 in the document reader 11 in order for the document reader 11 to read the document medium 95, the user inserts a tip end portion of the document medium 95 into the document feed port 61. When the document medium 95 is set in the document reader 11, the user may place a rear end portion of the document medium 95 on the top face of the exterior casing 28.

The main body 12 is provided with an operation unit 31 that is operated by the user to provide instructions to the document reader 11, and a housing unit 32 capable of housing a medium roll 91 on which a long print medium 90 is wound. The housing unit 32 is provided on an end portion on the negative Y direction side of the main body 12.

The housing unit 32 is capable of housing the medium roll 91 formed by winding the print medium 90 into a roll shape. The housing unit 32 includes a support shaft 37 that rotatably supports the medium roll 91. The medium roll 91 supported by the support shaft 37 is rotatable about an axis of the support shaft 37. The print medium 90 is fed out by rotation of the medium roll 91 in the counterclockwise direction in FIG. 2. The support shaft 37 is included in a feed unit 70 (see FIG. 5) to be described below, and is rotated by power from a feed motor.

As illustrated in FIG. 1 and FIG. 2, the housing unit 32 includes a housing unit cover 321 that can cover the medium roll 91 supported by the support shaft 37. The user can move the housing unit cover 321 to open an interior space of the housing unit 32 in the positive Y direction. In this way, the user can replace the medium roll 91 from the positive Y direction side.

As illustrated in FIG. 2, the document reader 11 is provided with a printing transport unit 40 that transports the print medium 90 fed out from the medium roll 91 housed in the housing unit 35. The printing transport unit 40 includes a printing transport roller 46, and a printing transport motor (not illustrated) that drives the printing transport roller 46. In the description below, simple reference to "the transport unit 40" refers to the printing transport unit 40.

The document reader 11 is provided with a printing unit 50 that performs printing on the print medium 90. The print medium 90 is transported to the printing unit 50 by the transport unit 40. The printing unit 50 includes a guide shaft 51 extending in the X axis direction, a carriage 52 supported by the guide shaft 51, a carriage motor (not illustrated) that causes the carriage 52 to reciprocate along the guide shaft 51, and a liquid ejection head 54 mounted on the carriage 52.

The print medium 90 transported by the transport unit 40 passes along the positive Y direction on the negative Z direction side of the carriage 52. The liquid ejection head 54 can face the print medium 90 passing on the negative Z direction side of the carriage 52. The liquid ejection head 54 ejects liquid in the negative Z direction while being caused to reciprocate in the X axis direction. In the document reader 11, the printing is performed by the liquid being ejected from the liquid ejection head 54 and by the ejected liquid being deposited on the print medium 90.

The liquid ejection head 54 according to the present embodiment is a serial type head, but the type is not limited thereto, and may be a line type head spanning the whole of the print medium 90 in the X axis direction. In the present embodiment, the feed unit 70, the transport unit 40, and the printing unit 50 configure a printing function unit 18 (see FIG. 5).

The main body 12 includes a printing discharge port 55 from which the print medium 90 printed by the printing unit 50 is discharged. The printing discharge port 55 is an opening provided in the front face 23 of the main body 12. The printing discharge port 55 extends in the X axis direction. In the description below, simple reference to "the discharge port 55" refers to the printing discharge port 55.

The main body 12 is provided with a guide plate 56 on the negative Z direction side of the discharge port 55. The guide plate 56 includes a guide face 561 facing in the positive Z direction. The guide face 561 is inclined downward in the negative Z direction increasingly toward the positive Y direction.

The print medium 90 printed by the printing unit 50 is discharged from the discharge port 55. A discharge direction of the print medium 90 at the discharge port 55 is a first direction D1. Here, the first direction D1 is a direction in which the print medium 90 is guided by the guide surface 561 in the course of being discharged from the discharge port 55. As a result, the first direction D1 is a direction that is orthogonal to the X axis, intersects the Y axis, and is inclined in the negative Z direction. In other words, the first direction D1 includes a component in the positive Y direction.

As illustrated in FIG. 1 and FIG. 2, the main body 12 is provided with the scanner unit 60 that reads the document medium 95. The document medium 95 is an object to be read by the scanner unit 60. The scanner unit 60 is provided on an end portion of the main body 12 on the positive Y direction side. The scanner unit 60 extends in the X axis direction.

Next, an overview of the scanner unit 60 will be described below.

Figure 3:
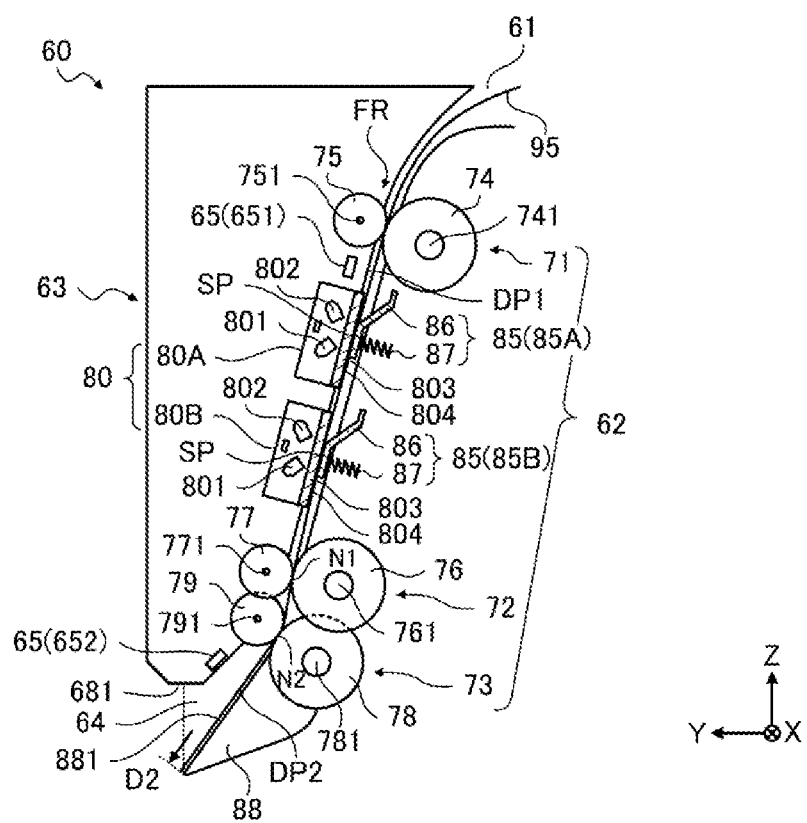
FIG. 3 is a side cross-sectional view illustrating a scanner unit.

As illustrated in FIG. 3, the scanner unit 60 includes a document feed port 61 into which the document medium 95 is inserted, a reading transport unit 62 that transports the document medium 95 inserted from the document feed port 61 along a transport path FR, a reading unit 63 that reads the document medium 95 transported by the transport unit 62, pressing mechanisms 85 that apply pressure on the document medium 95 toward the reading unit 63, a reading discharge port 64 that discharges the document medium 95 after the document medium 95 has been read, sensor units 65 that can detect the document medium 95, and the like. In the description below, simple reference to "the transport unit 62" refers to the reading transport unit 62, and simple reference to "the discharge port 64" refers to the reading discharge port 64.

The transport path FR that extends from the document feed port 61 to the discharge port 64 is inclined in the negative Z direction increasingly toward the positive Y direction. A second direction D2 that is a discharge direction of the document medium 95 includes a component in the positive Y direction. More specifically, the transport path FR is inclined at a predetermined angle that is acute with respect to the negative Z direction. As a result, as illustrated in FIG. 2, the document medium 95 discharged from the discharge port 64 is caused to move away from the discharge port 55. In particular, when the tip end of the document medium 95 discharged from the discharge port 64 is curled, when the tip end comes close to the discharge port 55, there is a risk that the tip end may enter into the interior of the document reader 11 from the discharge port 55. By causing the second direction D2 to include the component in the positive Y direction, the risk of the document medium 95 entering the interior of the document reader 11 from the discharge port 55 is reduced.

As illustrated in FIG. 3, the transport unit 62 includes an upstream driving roller pair 71, a first driving roller pair 72, which is a second roller pair, downstream of the upstream driving roller pair 71 on the transport path FR, and a second driving roller pair 73, which is a first roller pair, downstream of the first driving roller pair 72 on the transport path FR. The upstream driving roller pair 71, the first driving roller pair 72, and the second driving roller pair 73 respectively nip and transport the document medium 95. The reading unit 63 reads the image of the document medium 95 at a position between the upstream driving roller pair 71 and the first driving roller pair 72 on the transport path FR. Further, the transport unit 62 includes a reading transport motor 62M as a drive motor that drives the upstream driving roller pair 71, the first driving roller pair 72, and the second driving roller pair 73 (see FIG. 5). Note that, in the present embodiment, the second driving roller pair 73 is the first roller pair, but the first driving roller pair 72 may be the first roller pair. Note that, in the present embodiment, upstream on the transport path FR refers to upstream in the transport direction from the document feed port 61 toward the discharge port 64. Similarly, downstream on the transport path FR means downstream in the transport direction from the document feed port 61 to the discharge port 64.

As illustrated in FIG. 3, the upstream driving roller pair 71 is located upstream of a reading position SP of the reading unit 63 on the transfer path FR and includes an upstream driving roller 74 and an upstream driven roller 75. The upstream driving roller 74 is rotatably supported about an axis of an upstream driving shaft 741 extending in the X axis direction. The outer circumferential surface of the upstream driving roller 74 is covered by a member capable of elastic deformation. For example, the outer circumferential surface of the upstream driving roller 74 is covered by a synthetic rubber. The upstream driving roller 74 is driven by the transport motor 62M (see FIG. 5). The upstream driven roller 75 is rotatably supported about an axis of an upstream driven shaft 751 extending in the X axis direction. The axis of the upstream drive shaft 741 and the axis of the upstream driven shaft 751 are substantially parallel to each other.

The first driving roller pair 72 is located downstream of the reading position SP of the reading unit 63 on the transfer path FR and includes a first driving roller 76 and a first driven roller 77. The first driving roller 76 is rotatably supported about an axis of a first driving shaft 761 extending in the X axis direction. The first driving roller 76 is driven by the transport motor 62M. The first driven roller 77 is rotatably supported about an axis of a first driven shaft 771 extending in the X axis direction. The axis of the first drive shaft 761 and the axis of the first driven shaft 771 are substantially parallel to each other.

The second driving roller pair 73 is located downstream of the reading position SP of the reading unit 63 on the transfer path FR and includes a second driving roller 78 and a second driven roller 79. The second driving roller 78 is rotatably supported about an axis of a second driving shaft 781 extending in the X axis direction. The second driving roller 78 is driven by the transport motor 62M. The second driven roller 79 is rotatably supported about an axis of a second driven shaft 791 extending in the X axis direction. The axis of the second drive shaft 781 and the axis of the second driven shaft 791 are substantially parallel to each other.

The reading unit 63 is provided between the upstream driving roller pair 71 and the first driving roller pair 72 on the transport path FR.

The reading unit 63 according to the present embodiment includes, as contact image sensor (CIS) modules 80, a first CIS module 80A, and a second CIS module 80B. As illustrated in FIG. 3, each of the CIS modules 80 includes a light source 801, such as an LED, that irradiates light onto the document medium 95, a photoreceptor element 802, such as a CMOS sensor, that receives the light reflected from the document medium 95 during transport, and a contact glass 803 that comes into contact with the document medium 95. The document medium 95 is transported while in contact with a transmissive surface 804 of the contact glass 803. The light source 801 illuminates the document medium 95 with the light via the contact glass 803, and the photoreceptor element 802 reads the reflected light from the document medium 95.

The light source 80 and the photoreceptor element 802 of the CIS module 80 may be controlled by a control unit 100 to be described later, or by a dedicated control unit, such as a microprocessor provided in the CIS module 80. Reading results of the photoreceptor elements 802 of the CIS modules 80 are synthesized by the control unit 100 to be described later, and image data is generated.

In the CIS modules 80 according to the present embodiment, the photoreceptor elements 802 are arranged in the X axis direction. The CIS modules 80 collectively read a facing portion of the document medium 95 over a range corresponding to a dimension of the CIS modules 80 along the X axis direction. In the present embodiment, the first CIS module 80A and the second CIS module 80B partially overlap with each other in the X axis direction.

As the pressing mechanisms 85, the scanner unit 60 according to the present embodiment is provided with a pressing mechanism 85A that urges the document medium 95 in a direction so as to be pressed against the contact glass 803 of the first scanning module 80A, and a pressing mechanism 85B that urges the document medium 95 in a direction so as to be pressed against the contact glass 803 of the second CIS module 80B. The pressing mechanisms 85 are provided at positions at which the document medium 95 can be pressed between the upstream driving roller pair 71 and the first driving roller pair 72 in the transport direction of the document medium 95.

Each of the pressing mechanisms 85 includes a pressing plate 86 that can come into contact with the document medium 95, and a pressure spring 87 that urges the pressing plate 86 toward the transmissive surface 804. The pressing plate 86 of the pressing mechanism 85A faces the transmissive surface 804 of the first CIS module 80A, with the transport path FR interposed therebetween. The pressing plate 86 of the pressing mechanism 85B faces the transmissive surface 804 of the second CIS module 80B, with the transport path FR interposed therebetween.

The reading discharge port 64 is a space sandwiched, in the Z axis direction, by a discharge guide 88 and a wall portion 681 that faces the discharge guide 88 with the transport path FR interposed therebetween.

The sensor units 65 include a first sensor 651 capable of detecting the document medium 95, and a second sensor 652 as a detector capable of detecting the document medium 95 at a position different from that of the first sensor 651. A first detection position DP1, which is a detection position by the first sensor 651, is positioned upstream of the transmissive surface 804 of the first CIS module 80A, in the direction in which the document medium 95 is transported. When the document medium 95 is positioned at the first detection position DP1, the first sensor 651 detects the document medium 95, and when the document medium 95 is not positioned at the first detection position DP1, the first sensor 651 does not detect the document medium 95. A second detection position DP2, which is a detection position by the second sensor 652, is located downstream from the second driving roller pair 73 in the direction in which the document medium 95 is transported. When the document medium 95 is positioned at the second detection position DP2, the second sensor 652 detects the document medium 95, and when the document medium 95 is not positioned at the second detection position DP2, the second sensor 652 does not detect the document medium 95.

The discharge guide 88 is provided further to the negative Z direction side than the second driving roller pair 73. The discharge guide 88 is a plate-shaped member extending in the X axis direction. The discharge guide 88 includes a guide face 881 facing the positive Z direction. The guide face 881 is inclined downward in the negative Z direction increasingly toward the positive Y direction. The discharged document medium 95 is discharged along the guide face 881. In other words, the second direction D2, which is the direction in which the document medium 95 is discharged, is a direction that inclines downward in the negative Z direction increasingly toward the positive Y direction.

Figure 4:
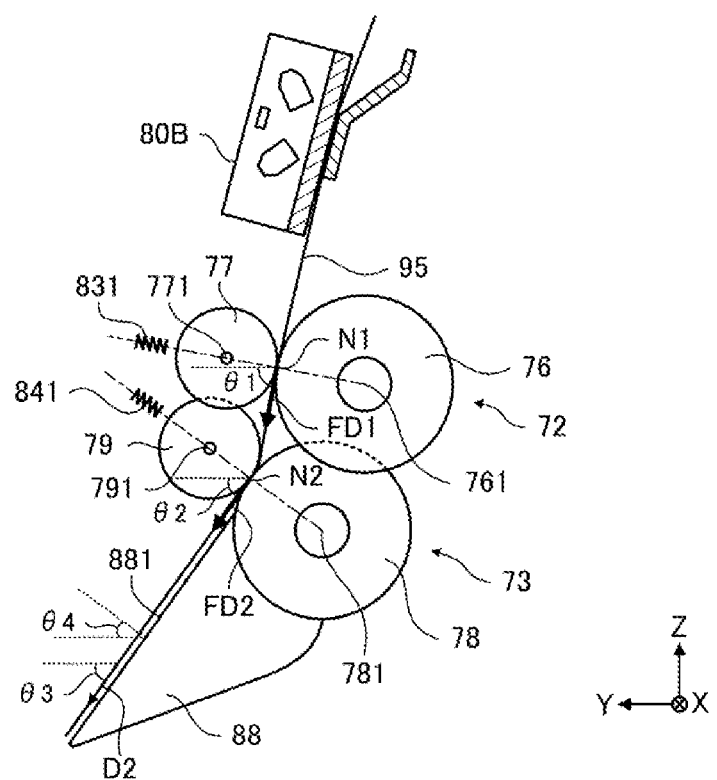
FIG. 4 is an enlarged cross-sectional view illustrating a portion of the scanner unit.

As illustrated in FIG. 4, a first transport direction FD1, which is the transport direction of the document medium 95 at a nipping position N1 of the first driving roller pair 72, is a direction that includes more of a vertically downward negative Z component than a component in the positive Y direction. In other words, taking a start point of the first transport direction FD1 as an intersection point, an angle θ1 of an angle formed between the horizontal plane and the first transport direction FD1 satisfies a condition of tan θ1≤−1. Note that in the present embodiment, the first transport direction FD1 is a direction along a tangent line of the first driving roller 76 that passes through the nipping position N1. In the present embodiment, an intersection point between a straight line connecting the center of the first drive shaft 761 and the center of the first driven shaft 771, and the outer circumferential surface of the first driving roller 76 is considered to be the nipping position N1. In a state in which the first driving roller 76 and the first driven roller 77 are in contact with each other, of the outer circumferential surface of the first driving roller 76, the center, in an outer circumferential direction, of a region that is in contact with the first driven roller 77, may be considered to be the nipping position N1.

As illustrated in FIG. 4, a second transport direction FD2, which is the transport direction of the document medium 95 at a nippin position N2 of the second driving roller pair 73, is a direction that includes more of the vertically downward negative Z component than the component in the positive Y direction. In addition, in the second transport direction FD2, a proportion of the component in the positive Y direction with respect to the vertically downward negative Z component is greater than a proportion of the component in the positive Y direction with respect to the vertically downward negative Z component in the first transport direction FD1. In other words, taking a start point of the second transport direction FD2 as an intersection point, an angle θ2 of an angle formed between the horizontal plane and the second transport direction FD2 satisfies a condition of tan θ1<tan θ2≤−1. Note that in the present embodiment, the second transport direction FD2 is a direction along a tangent line of the second driving roller 78 that passes through the nipping position N2. In the present embodiment, the intersection point between a straight line connecting the center of the second drive shaft 781 and the center of the second driven shaft 791, and the outer circumferential surface of the second drive roller 78 is considered to be the nipping position N2. In a state in which the second driving roller 78 and the second driven roller 79 are in contact with each other, of the outer circumferential surface of the second driving roller 78, the center, in the outer circumferential direction, of a region that is in contact with the second driven roller 79 may be considered to be the nipping position N2.

As illustrated in FIG. 4, the second direction D2, which is the direction along the guide surface 881, is a direction that includes more of the vertically downward negative Z component than the component in the positive Y direction. In other words, taking a start point of the second direction D2 as an intersection point, an angle θ3 of an angle formed between the horizontal plane and the second direction D2 satisfies a condition of tan θ3≤−1. At this time, an angle θ4 of an angle formed between the normal line direction of the guide surface 881 and the horizontal plane satisfies a condition tan θ4≤1. Thus, the second direction D2, which is the transport direction of a downstream portion downstream of the nipping position N2 on the transport path FR, is a direction that includes more of the vertically downward negative Z component than the component in the positive Y direction. Note that in the present embodiment, the second transport direction FD2 and the second direction D2 are the same direction, but they may be different from each other.

As described above, in the present embodiment, the transport path FR is a path through which the document medium 95 passes from the document feed port 61 to the discharge port 64. Further, as described above, the transport direction of the document medium 95 changes from the first transport direction FD1, through the second transport direction FD2, to the second direction D2, but the transport direction at any position on the transport path FR downstream of the nipping position N1 is the direction that includes more of the vertically downward negative Z component than the component in the positive Y direction.

Figure 5:
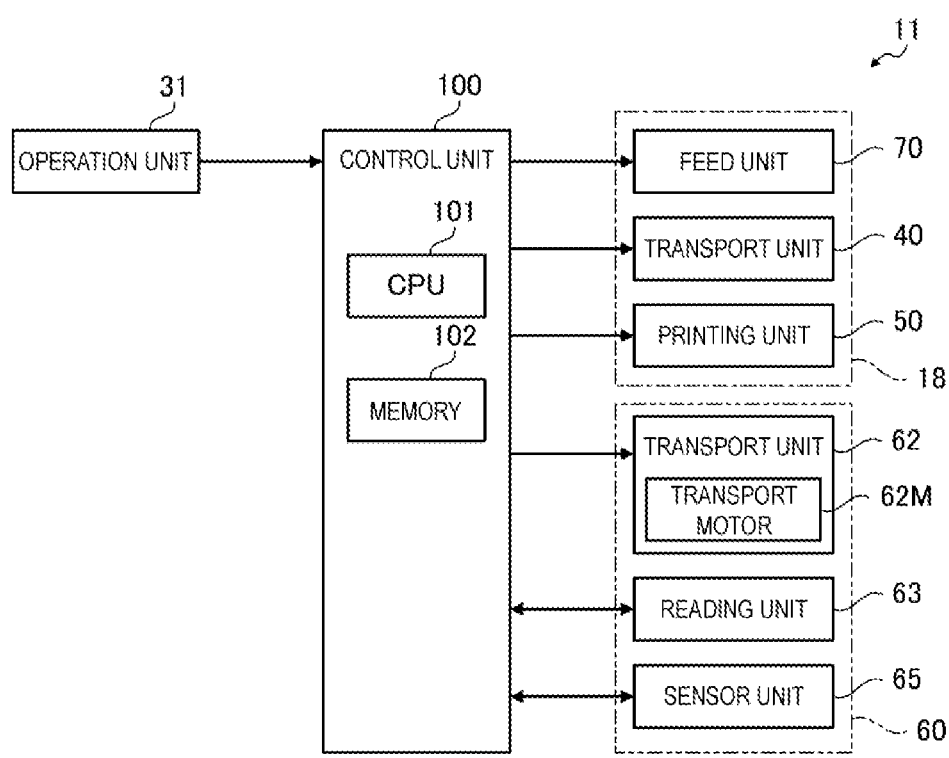
FIG. 5 is a block diagram illustrating an electrical configuration of the document reader.

The first driving roller 76 configuring the first driving roller pair 72 and the second driving roller 78 configuring the second driving roller pair 73 are driven by the reading transport motor 62M (see FIG. 5).

A first feed amount per unit by which the first driving roller 76 can feed the document medium 95 in one revolution is greater than a second feed amount per unit by which the second driving roller 78 can feed the document medium 95 in one revolution. That is, a circumferential speed of the second driving roller 78 is less than a circumferential speed of the first driving roller 76. The difference between the circumferential speeds of the first driving roller 76 and the second driving roller 78 is set by the difference in roller diameter in the present embodiment. Specifically, in the present embodiment, the diameter of the second driving roller 78 is smaller than the diameter of the first driving roller 76, and the first driving roller 76 and the second driving roller 78 are driven at the same rotational speed by the transport motor 62M. As a result, the circumferential speed of the second driving roller 78 is less than the circumferential speed of the first driving roller 76. In the present embodiment, the roller diameter of the first driving roller 76 and the roller diameter of the second driving roller 78 are different, but it is sufficient that the first feed amount per unit of the first driving roller 76 be configured to be greater than the second feed amount per unit of the second driving roller 78. For example, the first driving roller 76 and the second driving roller 78 may have the same roller diameter, and a rotational speed of the first driving roller 76 may be greater than a rotational speed of the second driving roller 78. In addition, both the roller diameter and the rotational speed may be configured to be different from each other.

Since the first feed amount per unit of the first driving roller 76 is smaller than the second feed amount per unit of the second driving roller 78, the second driving roller pair 73 does not pull the document medium 95 downstream. As a result, variations in the transport speed at a portion corresponding to the reading position SP of the document medium 95 caused by a transport force when the second driving roller pair 73 transports the document medium 95 are suppressed.

Further, a nipping force between the second driving roller 78 and the second driven roller 79 configuring the second driving roller pair 73 is less than a nipping force between the first driving roller 76 and the first driven roller 77 configuring the first driving roller pair 72.

The first driven roller 77 configuring the first driving roller pair 72 is urged in a direction toward the first driving roller 76 by a first spring 831. Thus, the nipping force by which the first driving roller pair 72 nips the document medium 95 is determined by an urging force of the first spring 831. The first spring 831 is a compression spring. Note that the first spring 831 is not limited to being the compression spring, and another type of spring, such as a bar spring, may be used as long as the first spring 831 can impart the urging force to the first driven roller 77.

The second driven roller 79 configuring the second driving roller pair 73 is urged in a direction toward the second driving roller 78 by a second spring 841. Thus, the nipping force by which the second driving roller pair 73 nips the document medium 95 is determined by an urging force of the second spring 841. The second spring 841 is a bar spring. Note that the second spring 841 is not limited to being the bar spring, and another type of spring, such as a compression spring, may be used as long as the second spring 841 can impart the urging force to the second driven roller 79.

A spring constant of the second spring 841 is less than a spring constant of the first spring 831. In other words, the urging force of the second spring 841 is smaller than that of the first spring 831. Thus, the nipping force of the second driving roller pair 73 is weaker than the nipping force of the first driving roller pair 72.

Next, an electrical configuration of the document reader 11 will be described.

As illustrated in FIG. 5, the document reader 11 is provided with the control unit 100. The control unit 100 is provided with a CPU 101, and a memory 102, which includes a RAM, a ROM, a nonvolatile memory, and the like. Various programs for controlling the document reader 11 are stored in the memory 102. The control unit 100 may be configured to include dedicated hardware (an application-specific integrated circuit (ASIC)) that performs at least a portion of various processing. That is, the control unit 100 may be configured to include one or more processors that run in accordance with a computer program (software), one or more dedicated hardware such as an ASIC, or a combination of these. The processor includes the CPU 101, and the memory 102, such as the RAM and the ROM. The memory 102 stores program codes or commands configured to perform the processing on the CPU 101. The memory 102, which is an example of a computer-readable medium, includes various types that can be accessed by a general-purpose or dedicated computer.

The control unit 100 is coupled to the operation unit 31. Operation signals that are output when the operation unit 31 is operated are input to the control unit 100. When a predetermined operation is performed on the operation unit 31, a copy request signal is output by the operation unit 31, and when the copy request signal is input to the control unit 100, the control unit 100 receives the copy request. After receiving the copy request, the control unit 100 reads an image of the document medium 95, using the reading unit 63 of the scanner unit 60, and generates image data, and also prints an image based on the generated image data on the print medium 90, using the printing function unit 18.

Further, the sensor units 65 are electrically coupled to the control unit 100. The control unit 100 determines the state of the document medium 95 based on a change in an output by the sensor units 65.

The first sensor 651 is electrically coupled to the 100 as the sensor unit 65 electrically coupled to the control unit 100. The output from the first sensor 651 when the first sensor 651 detects the document medium 95 is a first output, and the output from the first sensor 651 when the first sensor 651 does not detect the document medium 95 is a second output. When the output from the first sensor 651 changes from the second output to the first output, the control unit 100 determines that the tip of the document medium 95 has passed through the first detection position DP1. When the tip of the document medium 95 passes through the first detection position DP1, the control unit 100 starts a count of a counter (not illustrated). The control unit 100 synthesizes the reading results by the photoreceptor elements 802 of the reading unit 63, based on the position of the document medium 95 estimated from the count value.

Further, when the output from the first sensor 651 changes from the first output to the second output, the control unit 100 determines that the rear end of the document medium 95 has passed through the first detection position DP1. The control unit 100 starts the count of the counter when the rear end of the document medium 95 passes through the first detection position DP1. On the basis of the position of the rear end of the document medium 95 estimated from the count value, the control unit 100 performs a document medium holding operation to be described below.

As the sensor unit 65 electrically coupled to the control unit 100, the second sensor 652 is electrically coupled to the control unit 100. The output from the second sensor 652 when the second sensor 652 detects the document medium 95 is a third output, and the output from the second sensor 652 when the second sensor 652 does not detect the document medium 95 is a fourth output. The second sensor 652 detects the document medium 95 in a state of being nipped by the second driving roller pair 73, in the document medium holding operation to be described below. In the document medium holding operation, when the output from the second sensor 652 changes from the third output to the fourth output, the control unit 100 determines that the document medium 95 nipped by the second driving roller pair 73 has been removed by the user.

Note that the control unit 100 is coupled in a manner that allows bidirectional communication with an input/output unit (not illustrated). The input/output unit is configured to be connectable to a host device, such as a personal computer. A print request signal, a reading request signal, and a copy request signal output by the host device connected to the input/output unit can be input to the control unit 100. Note that the input/output unit may be configured to allow wired connection, or may be configured to allow wireless connection.

When the print request signal is input from the host device, the control unit 100 controls the printing function unit 18 and prints image data on the print medium 90, such as images and characters, based on a print image input from the host device. The print request signal is output to the control unit 100 from the host device by the user operating the host device.

When the read request signal is input from the host device, the control unit 100 controls the scanner unit 60 to read the image of the document medium 95 and generate the image data, and outputs the generated image data from the input/output unit to the host device. The read request signal is output from the host device to the control unit 100 by the user operating the host device.

The control unit 100 is electrically coupled to the feed unit 70, the transport unit 40, and the printing unit 50 configuring the printing function unit 18. The control unit 100 controls the feed unit 70, the transport unit 40, and the printing unit 50 as the printing function unit 18. The control unit 100 is electrically coupled to the transport unit 62 and the reading unit 63 configuring the scanner unit 60. The control unit 100 controls the transport unit 62 and the reading unit 63 as the scanner unit 60. The transport motor 62M included in the transport unit 62 generates a driving force that rotates the upstream driving roller 74, the first driving roller 76, and the second driving roller 78. In other words, the transport motor 62M drives the driving roller that configures each of the roller pairs of the upstream driving roller pair 71, the first driving roller pair 72, and the second driving roller pair 73. The control unit 100 controls the transport motor 62M to rotate the upstream driving roller pair 71, the first driving roller pair 72, and the second driving roller pair 73, and transports the document medium 95. The control unit 100 causes the reading unit 63 to read the document medium 95.

Figure 6:
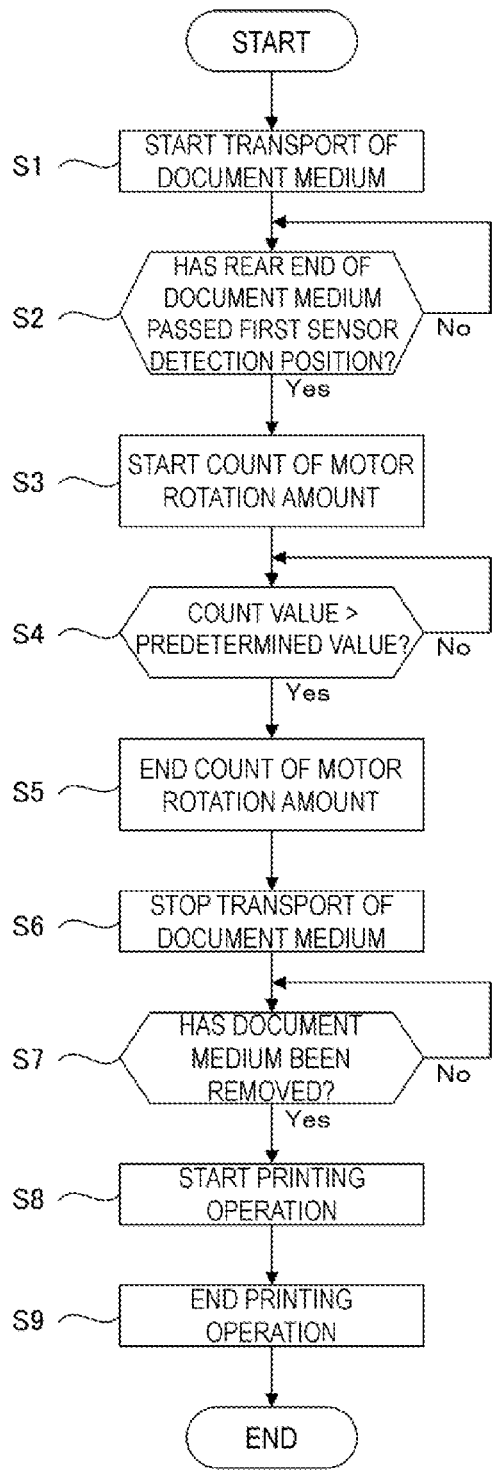
FIG. 6 is a flowchart illustrating control content by a control unit.

Using a flowchart in FIG. 6, control content will be described when the control unit 100 has received the copy request in a state in which the document medium 95 is inserted into the document feed port 61, and the medium roll 91 is housed in the housing unit 32.

Upon receiving the copy request, the control unit 100 controls the transport motor 62M, and starts the transport of the document medium 95 inserted into the document feed port 61 (step S1). At step S1, the control unit 100 controls the transport motor 62M, and rotates the upstream driving roller pair 71, the first driving roller pair 72, and the second driving roller pair 73. After starting the transport of the document medium 95, the control unit 100 controls the reading unit 63, and causes the reading unit 63 to read the image of the document medium 95 when the document medium 95 passes through the reading position SP.

The control unit 100 controls the light source 801 of each of the CIS modules 80 so that white light is irradiated onto the document medium 95. The results detected by the plurality of photoreceptor elements 802 via red, blue, and green filters are input to the control unit 100. As described above, when the tip of the document medium 95 passes through the first detection position DP1, the count by the counter is started. The control unit 100 synthesizes the detection results from the photoreceptor elements 802 of the plurality of CIS modules 80, and thus generates color image data, such as characters and images recorded on the document medium 95. Note that the control unit 100 stores the generated color image data in the memory 102.

The control unit 100 determines whether or not, from the start of the transport of the document medium 95 at step S1, the rear end of the document medium 95 has passed through the first detection position DP1 (step S2). More specifically, the output by the first sensor 651 is monitored for the change from the first output indicating that the document medium 95 is detected, to the second output indicating that the document medium 95 is not detected. When the output by the first sensor 651 changes from the first output to the second output, the control unit 100 determines that the rear end of the document medium 95 has passed through the first detection position DP1 (yes at step S2).

When the control unit 100 determines that the rear end of the document medium 95 has passed through the first detection position DP1 (yes at step S2), using the counter, the control unit 100 starts the count of a motor rotation amount (step S3). After starting the count of the motor rotation amount, the control unit 100 determines whether or not the count value has exceeded a preset predetermined value (step S4).

Here, the predetermined value used for the determination at step S4 is a value corresponding to a length between the first detection position DP1 of the first sensor and the nipping position N1 on the transport path FR. More specifically, the predetermined value is set on the basis of the length between the first detection position DP1 and the nipping position N1 on the transport path FR and the circumferential speed of the first driving roller 76. Thus, the predetermined value is set to a value such that, after the rear end of the document medium 95 passes through the first detection position DP1, the rear end of the document medium 95 is positioned at the nipping position N1 when the motor rotation amount reaches the predetermined value, Accordingly, the determination at step S4 by the control unit 100 is considered to be a determination of whether the rear end of the document medium 95 has passed through the nipping position N1.

When the control unit 100 determines that the count value of the counter has exceeded the predetermined value (yes at step S4), the control unit 100 terminates the count of the motor rotation amount by the counter (step S5), and controls the transport motor 62M to stop the transport of the document medium 95 (step S6). Accordingly, the control unit 100 stops the rotation of the upstream driving roller pair 71, the first driving roller pair 72, and the second driving roller pair 73 in a state in which the document medium 95 is not positioned at the reading position SP of the reading unit 63 and the document medium 95 is also not positioned at the nipping position N1. At step S6, the control unit 100 stops the transport of the document medium 95 before the rear end of the document medium 95 passes through the nipping position N2 of the second driving roller pair 73. Note that in the present embodiment, the control unit 100 performs step S6 after performing step S5, but it is sufficient that step S6 be performed before the rear end of the document medium 95 passes through the nipping position N2, and a configuration may be adopted in which step S6 is performed before step S5, or a configuration may be adopted in which step S5 and step S6 are performed in parallel.

When the control unit 100 stops the transport of the document medium 95 at step S6, the document medium 95 is held by the document reader 11 without falling from the discharge port 64. More specifically, the document medium 95 is held by the document reader 11 in a state in which the vicinity of the rear end of the document medium 95 is nipped by the second driving roller pair 73 and the tip of the document medium 95 hangs down from the discharge port 64. In other words, the control unit 100 performs step S6 as the document medium holding operation for holding the document medium 95.

After stopping the transport of the document medium 95 at step S6, the control unit 100 determines whether or not the document medium 95 has been removed (step S7). As described above, while the document medium holding operation is being performed, the second sensor 652 detects the document medium 95. Thus, after the control unit 100 performs step S6, the output by the second sensor 652 is the third output. At step S7, the control unit 100 monitors for a change in the output by the second sensor 652 from the third output to the fourth output indicating that the document medium 95 is not detected. When the output from the second sensor 652 changes from the third output to the fourth output, the control unit 100 determines that the held document medium 95 has been removed (yes at step S7). By removing the document medium 95, the document medium holding operation ends.

When it is determined that the held document medium 95 has not been removed (no at step S7), the control unit 100 does not start a printing operation, and when it is determined that the held document medium 95 has been removed (yes at step S7) the control unit 100 controls the printing function unit 18 to start the printing operation for printing the image data stored in the memory 102 on the print medium 90 (step S8). At step S8, the control unit 100 controls the feed motor of the feed unit 70 and the transport motor of the transport unit 40 to transport the print medium 90. Then, the control unit 100 controls the carriage motor and the liquid ejection head 54 of the printing unit 50 to eject the liquid onto the print medium 90 when the print medium 90 passes through a printing position of the printing unit 50. In this way, the control unit 100 controls the transport unit 40, and the image data is printed on the print medium 90. The control unit 100 causes the print medium 90 on which image data is printed to be discharged from the discharge port 55.

After discharging the print medium 90 from the discharge port 55, the control unit 100 controls the printing function unit 18 and ends the printing operation (step S9). More specifically, the control unit 100 controls the feed motor of the feed unit 70 and the transport motor of the transport unit 40 to move the tip of the print medium 90 upstream of the liquid ejection head 54, and controls the carriage motor of the printing unit 50 to move the carriage 52 to a standby position. In this way, the control that is performed when the control unit 100 has received the copy request ends.

Next, effects of the present embodiment will be described.

In the present embodiment, the control unit 100 performs the document medium holding operation. In the document medium holding operation, the document medium 95 from which the image has been read by the reading unit 63 is held by the document reader 11 in a state in which the rear end of the document medium 95 is nipped by the second driving roller pair 73. In a configuration in which a placement unit is provided that has a substantially horizontal surface that supports the document medium 95 that has been wholly discharged from the discharge port 64, and the document medium 95 is held on the placement unit, an area occupied by the placement unit needs to be included in a space required for installation of the document reader 11. As a result, the space required for the installation of the document reader 11 tends to be large. In contrast, in the configuration in which the second driving roller pair 73 holds the document medium 95, the space required for the installation of the document reader 11 is easily reduced.

In addition, in the configuration described above in which the placement unit is provided that supports the document medium 95 discharged wholly from the discharge port 64, when the dimensions of the ejected document medium 95 exceed loadable dimensions of the placement unit, there is a risk that the document medium 95 may fall from the placement unit. Thus, it is necessary for the user to set the placement unit according to the dimensions of the document medium 95. In contrast, in the present embodiment, the rear end of the document medium 95 is held in the state of being nipped by the second driving roller pair 73, and thus the document medium 95 can be held by the document reader 11 regardless of the dimensions of the document medium 95.

However, there is a risk that the document medium 95 may become deformed when left in a bent state for a long period of time. In particular, when a bend angle is acute or the curvature of a curve is small, the document medium 95 easily becomes deformed. When the document medium 95 becomes deformed, transport accuracy, or a distance to the reading unit 63 is affected, and thus the reading accuracy of the deformed document medium 95 is more likely to deteriorate.

Since the document medium holding operation is an operation of holding the document medium 95 for a fixed period of time, if the document medium 95 held by the document reader 11 in the document medium holding operation is significantly curved, the document medium 95 is likely to become deformed. In this regard, in the present embodiment, the difference in angle between the transport path FR that is downstream of the nipping position N2 of the second driving roller pair 73 at which the document medium 95 is nipped, and the negative Z direction, which is a direction in which the document medium 95 hangs from the discharge port 64, is small. As a result, deformation of the document medium 95 due to the document medium holding operation is suppressed.

In the present embodiment, the nipping force of the first driving roller pair 72 nipping the document medium 95 downstream of the reading position SP is preferably equal to or greater than a constant value, in order to stabilize the transport of the document medium 95 at the reading position SP. However, for example, when the first driving roller pair 72 nips the document medium 95 in the document medium holding operation, the greater the nipping force, the greater a load when the user removes the held document medium 95. In this regard, in the document medium holding operation according to the present embodiment, the document medium 95 is held by the second driving roller pair 73 having the smaller nipping force than the first driving roller pair 72. As a result, the load when the user removes the document medium 95 is reduced.

Also, the circumferential speed of the first driving roller 76 is greater than the circumferential speed of the second driving roller 78. Due to the difference between the circumferential speed of the first driving roller 76 and the circumferential speed of the second driving roller 78, the document medium 95 easily becomes slack between the first driving roller pair 72 and the second driving roller pair 73. As described above, because the nipping force of the second driving roller pair 73 is smaller than the nipping force of the first driving roller pair 72, the slackening of the document medium 95 between the first driving roller pair 72 and the second driving roller pair 73 caused by slippage of the document medium 95 occurring at the nipping position N2 of the second driving roller pair 73 is eliminated.

Since the transport of the document medium 95 is influenced by the material and dimensions of the document medium 95, there is a risk that the position of the document medium 95 estimated by the rotation amount of the transport motor 62M may be different from the position of the actual document medium 95. For example, when the document medium 95 of a material that does not easily slip with respect to the first driving roller pair 72 is transported, the document medium 95 is transported by a transport amount greater than an assumed transport amount of the document medium 95 with respect to the rotation angle of the first driving roller 76. In this case, there is a risk that the rear end of the document medium 95 may pass through the nipping position N1 before the count value of the transport motor 62M exceeds the predetermined value. In particular, when the circumferential speed of the second driving roller 78 is greater than the circumferential speed of the first driving roller 76 and the length between the nipping position N1 and the nipping position N2 is short, there is a risk that the rear end of the document medium 95 may pass through the nipping position N2, and the document medium 95 may not be held. In this regard, since the circumferential speed of the second driving roller 78 is slower than the circumferential speed of the first driving roller 76, the possibility of the rear end of the document medium 95 passing through the nipping position N2 is small.

Both the reading discharge port 64 and the printing discharge port 55 are provided on the positive Y direction side of the document reader 11, and the reading discharge port 64 is provided in the vicinity of the printing discharge port 55. Thus, the user can easily retrieve the document medium 95 discharged from the discharge port 64 and the print medium 90 discharged from the printing discharge port 55 from the positive Y direction side of the document reader 11.

When printing is performed by the printing function unit 18 while the document medium 95 is held by the document reader 11, there is a possibility of a defect of the document medium 95 falling due to vibrations occurring in the document reader 11 as a result of the printing, or due to the print medium 90 discharged from the printing discharge port 55, or a defect of a deterioration in printing accuracy as a result of the discharge of the print medium 90 being obstructed by the document medium 95. In particular, in the document reader 11 according to the present embodiment, the discharge direction of the print medium 90 at the printing discharge port 55 intersects with the document medium 95 held in the document medium holding operation, and thus, there is a risk that the printing accuracy of the print medium 90 may deteriorate due to the print medium 90 discharged from the discharge port 55 coming into contact with the held document medium 95.

The control unit 100 determines whether or not the document medium 95 held in the document medium holding operation has been removed based on the output from the second sensor 652. Thus, when a signal requesting printing by the printing function unit 18 is input in a state in which the held document medium 95 is not removed, the control unit 100 is able to perform control notifying the user that there is a possibility of a defect occurring, or control to not start the printing by the printing function unit 18 until the document medium 95 has been removed.

Further, when the user inputting the print request signal is different from the user inputting the read request signal, if the printing by the printing function unit 18 is not started due to the held document medium 95 not being removed, there is a risk that user convenience may deteriorate. The control unit 100 according to the present embodiment can limit the control of the printing function unit 18 based on the output by the second sensor 652 only, when the copy request is received. In this way, it is possible to reduce the possibility of the defect occurring, while securing the user convenience when the read request signal input and the print request signal input are made separately.

Effects of the present embodiment will now be described.

(1) The document reader 11 includes the reading unit 63 that reads the image of the document medium 95 being transported, the second driving roller pair 73 as the first roller pair that nips and transports the document medium 95 at the nipping position N2 downstream on the transport path FR, and the control unit 100 that controls the rotation of the second driving roller pair 73. The control unit 100 stops the rotation of the second driving roller pair 73 in the state in which the document medium 95 is not positioned at the reading position SP and the document medium 95 is nipped between the second driving roller pair 73. Thus, regardless of the dimensions of the document medium 95 from which the image is read, the document medium 95 from which the image has been read by the reading unit 63 does not fall from the discharge port 64 and is held by the document reader 11. Thus, the possibility of deformation of the document medium 95 discharged from the discharge port 64 due to the falling is reduced.

(2) The second transport direction FD2 at the nipping position N2 of the second driving roller pair 73 is the direction that includes more of the vertically downward negative Z component than the component in the positive Y direction. Further, the transport direction of the transport path FR downstream of the nipping position N2 and upstream of the discharge port 64 is also the direction that includes more of the vertically downward negative Z component than the component in the positive Y direction. Thus, of the document medium 95 held in the document medium holding operation, an amount of curvature between a portion of the document medium 95 positioned on the transport path and a portion of the document medium 95 hanging down from the discharge port 64 is small. Thus, even when the state in which the document medium 95 is held in the document medium holding operation is maintained for an extended period, the document medium 95 is less likely to be deformed.

(3) The first driving roller pair 72 is provided as the second roller pair that nips and transports the document medium 95 downstream, on the transport path FR, of the reading position SP of the reading portion 63 and upstream of the nipping position N2 of the second driving roller pair 73. The nipping force of the second driving roller pair 73 is smaller than the nipping force of the first driving roller pair 72. Thus, the nipping force of the second driving roller pair 73 holding the document medium 95 in the document medium holding operation is set to be small, while the nipping force of the first driving roller pair 72 that contributes to the transport of the document medium 95 at the reading position SP is maintained. Thus, using a configuration having little impact on the reading accuracy of the reading unit 63, the load when the user removes the document medium 95 held in the document medium holding operation can be reduced.

(4) The transport motor 62M that generates the driving force to rotate the second driving roller 78 of the second driving roller pair 73 and the first driving roller 76 of the first driving roller pair 72 is provided, and the control unit 100 controls the transport motor 62M. The circumferential speed of the second driving roller 78 is slower than the circumferential speed of the first driving roller 76. Thus, after the rear end of the document medium 95 passes through the nipping position N1, a transport amount of the transportation by the second driving roller pair 73 is small. Thus, the reliability of the document medium holding operation in which only the second driving roller pair 73 holds the document medium 95 is improved.

(5) The printing function unit 18 is provided that includes the printing unit 50 that prints the image on the print medium 90, and the printing transport unit 40 that transports the print medium 90, and the second sensor 652 is provided that detects the document medium 95 in the state in which the document medium holding operation is being performed by the control unit 100. The control unit 100 can control the printing by the printing function unit 18. According to this configuration, the control unit 100 can control the printing function unit 18 on the basis of the output from the second sensor 652. Thus, the control unit 100 can control the printing function unit 18 in accordance with the state of the document medium 95, after performing the document medium holding operation.

(6) The control unit 100 controls the printing by the printing function unit 18. Further, the control unit 100 performs the printing by the printing function unit 18 when the second sensor 652 does not detect the document medium 95. According to this configuration, the control unit 100 performs the printing by the printing function unit 18 when the document medium 95 held in the document medium holding operation is removed by the user. Thus, it is possible to reduce the occurrence of a defect that occurs when the printing by the printing function unit 18 is performed while the document medium 95 is held.

(7) When the second sensor 652 does not detect the document medium 95, the control unit 100 controls the printing function unit 18 to print the image of the document medium 95 read by the reading unit 63. According to this configuration, when the control unit 100 receives the copy request, the control unit 100 performs the printing of the image of the document medium 95 by the printing function unit 18 when the document medium 95 held in the document medium holding operation is removed. Thus, while securing the user convenience when the print request signal and the read request signal are input to the control unit 100 separately, it is possible to reduce the occurrence of a defect that may occur when the control unit 100 receives the copy request.

(8) A control method is a control method for the document reader 11 including the reading unit 63 that reads the image of the document medium 95 being transported, and the first roller pair 73 that nips and transports the document medium 95 at the nipping position N2, downstream of the reading position SP of the reading unit 63 on the transport path FR. The control method includes performing the document medium holding operation that stops the rotation of the second drive roller pair 73 in the state in which the document medium 95 is not positioned in the reading position SP, and the document medium 95 is nipped by second drive roller pair 73. According to this configuration, the possibility of the deformation of the document medium 95 discharged from the discharge port 64 due to the falling is reduced.

(9) The printing function unit 18 is provided that includes the printing transport unit 40 that transports the print medium 90, and the printing unit 50 that prints the image on the print medium 90 being transported, and, after the document medium holding operation has been performed, and when it is determined, at step S7, that the document medium 95 has been removed, the printing on the print medium 90 by the printing function unit 18 is started. Thus, it is possible to reduce the occurrence of a defect that occurs when the printing by the printing function unit 18 is performed while the document medium 95 is held.

Note that the above-described embodiment may be modified, such as in the following modified examples. In addition, the above-described embodiment and the modified examples to be described below can be further modified as appropriate, or combinations of the following modified examples in appropriate combinations can be used as further modified examples.

The determination at step S7 by the control unit 100 is not limited to being based on the output of the second sensor 652. The control unit 100 may be configured to perform the determination at step S7 based on an input by the user instead of the output by the second sensor 652. For example, a configuration may be adopted in which notification is made prompting the user to remove the document medium 95 held in the document medium holding operation, and when the user removes the document medium 95, the operation unit 31 may be operated to input a signal to the control unit 100 indicating that the document medium 95 has been removed.

Further, the control unit 100 may be configured to perform the determination at step S7 based on a state of the second driving roller pair 73 nipping the document medium 95 in the document medium holding operation. For example, since the position of the second driven roller 79 when the second driving roller pair 73 nips the document medium 95 is different from the position of the second driven roller 79 when the second driving roller pair 73 does not nip the document medium 95, a sensor for detecting the position of the second driven roller 79 may be provided, and the control unit 100 may be configured to make the determination at step S7 based on an output from the sensor.

The second driving roller pair 73 may be replaced by a configuration in which the first driving roller pair 72 nips the document medium 95 in the document medium holding operation. In this case, for example, the predetermined value used by the control unit 100 in the determination at step S4 is set based on the length between the first detection position DP1 on the transport path FR and the downstream end of the reading position SP. Then, after the rear end of the document medium 95 passes through the reading position SP and before the rear end of the document medium 95 passes through the nipping position N1, the control unit 100 stops the transport of the document medium 95. Note that, as described above, the transport direction between the nipping position N1 and the nipping position N2, as the transport direction of a downstream portion further downstream on the transport path FR than the nipping position N1, the second transport direction FD2, and the second direction D2 are directions that include more of the vertically downward negative Z component than the component in the positive Y direction.

The upstream driving roller pair 71 may be replaced by a configuration including only the upstream driving roller 74, without a driven roller. For example, a configuration may be adopted in which the document medium 95 is pushed against a wall surface of a path forming member that forms the transport path FR by the upstream driving roller 74, and the document medium 95 may be transported while being caused to slide along the wall surface. Further, the first driving roller pair 72 may be replaced by a configuration including only the first driving roller 76, without a driven roller. For example, a configuration may be adopted in which the document medium 95 is pushed against the wall surface of the path forming member that forms the transport path FR by the first driving roller 76, and the document medium 95 may be transported while being caused to slide along the wall surface. Furthermore, the second driving roller pair 73 may be replaced by a configuration including only the second driving roller 78, without a driven roller. For example, a configuration may be adopted in which the document medium 95 is pushed against the wall surface of the path forming member that forms the transport path FR by the second driving roller 78, and the document medium 95 may be transported while being caused to slide along the wall surface.

It is sufficient that an arrangement pattern of the CIS modules 80 configuring the reading unit 63 be an arrangement pattern capable of reading the entire width of the document medium 95. For example, the CIS modules 80 may be arranged in an arrangement pattern of a plurality of three or more rows in which the plurality of CIS modules 80 partially overlap with each other along the X axis.

The reading unit 63 may have a configuration in which the single long CIS module 80 is disposed so that its longitudinal direction is parallel to the X axis.

A motor that drives the first driving roller 76 and a motor that drives the second driving roller 78 may be provided separately.

The circumferential speeds of each of the first driving roller 76 and the second driving roller 78 may be the same. For example, the outer diameters of the first driving roller 76 and the second driving roller 78 may be the same.

The nipping forces of the first driving roller pair 72 and the second driving roller pair 73 may be the same. For example, the urging force of the first driven roller 77 and the urging force of the second driven roller 79 may be the same. In this case, the first driven roller 77 and the second driven roller 79 may have the same urging structure including a spring. Further, the spring may have a configuration in which a coil spring is disposed so that an axis thereof is oriented to be parallel with the urging direction, or a configuration in which a bar spring is disposed so that an axis thereof intersects the urging direction.

When the nipping forces of the first driving roller pair 72 and the second driving roller pair 73 are different, the urging structure that urges the driven roller may be the same. A configuration may be adopted in which a coil spring is disposed so that an axis thereof is oriented to be parallel with the urging direction, or a configuration may be adopted in which a bar spring is disposed so that an axis thereof intersects the urging direction. In this case, the elastic modulus of the coil spring may be caused to be different, or the elastic modulus of the bar spring may be caused to be different.

The printing function unit 18 may be provided with a cutting unit that cuts the print medium 90, downstream of the printing unit 50 in the transport direction.

The scanner unit 60 is not limited to being configured to scan the document medium 95 and generate the color image data. The scanner unit 60 may be configured to generate image data of a single color. In this case, the scanning unit 63 may irradiate light of a single color and scan the light reflected from the document medium 95. Further, in the scanning unit 63, the light irradiated onto the document medium 95 is not limited to visible light.

The scanner unit 60 is not limited to being configured to scan the medium 95 and generate the image data. As the scanning unit 63, a colorimetry unit that measures the color of the document medium 95 may be provided.

The CIS module 80 configuring the scanning unit 63 may be configured so that the light source irradiates red light, blue light, and green light onto the document medium 95 while switching between these light colors, and the reflected light may be read by the photoreceptor elements for each of the light colors being sequentially switched.

The printing function unit 18 may be a page printer that performs the printing page-by-page.

The print medium 90 is not limited to the long medium, and may be a short medium.

The document reader 11 need not necessarily be provided with the legs 13.

The material of the document medium 95 is not limited to paper, and may be a synthetic resin film or sheet, a cloth, a non-woven fabric, a composite film (laminate sheet) of synthetic resin and metal, a metal foil, a ceramic sheet, or the like.

The printing function unit 18 in the document reader 11 is not limited to the ink-jet type printer, and may be an ink-jet type textile printing function unit. Further, the printing function unit 18 may be a dot impact recording type. Further, the document reader 11 is not limited to the serial printer, and may be a lateral printer, a line printer, or a page printer.

Hereinafter, technical concepts and effects that are understood from the above-described embodiment and modified examples will be described.

A document reader reading an image of a document medium being transported and outputs image data includes a reading unit configured to read the image of the document medium, a first roller pair configured to nip and transport the document medium downstream of a read-enabling position of the reading unit on a transport path along which the document medium is transported, and a control unit configured to control a rotation of the first roller pair. The control unit stops, as a document medium holding operation, the rotation of the first roller pair in a state in which the document medium is not positioned in the read-enabling position of the reading unit and in a state in which the document medium is nipped by the first roller pair.

According to this configuration, regardless of the dimensions of the document medium from which the image is read, the document medium from which the image has been read by the reading unit does not fall from a discharge port, and is held by the document reader. Accordingly, the risk of deformation of the document medium discharged from the discharge port due to falling is reduced.

In the above-described document reader, transport directions of the document medium at a nipping position of the first roller pair and at a downstream portion downstream of the nipping position on the transport path may be directions that include a greater number of vertical direction components than horizontal direction components.

According to this configuration, of the document medium held in the document medium holding operation, an amount of curvature between a portion of the document medium positioned on the transport path and a portion of the document medium hanging down from the discharge port is small. Thus, even when the state in which the document medium is held in the document medium holding operation is maintained for an extended period, the document medium is less likely to be deformed.

The above-described document reader may further include a second roller pair configured to nip and transport the document medium downstream of the read-enabling position of the reading unit on the transport path, and upstream of the first roller pair on the transport path. Then, a nipping force of the first roller pair may be smaller than a nipping force of the second roller pair.

According to this configuration, the nipping force of the first roller pair holding the document medium in the document medium holding operation is set to be small, while the nipping force of the second roller pair that contributes to the transport of the document medium at the reading position is maintained. Thus, using a configuration having little impact on a reading accuracy of the reading unit, the load when a user removes the document medium held in the document medium holding operation can be reduced.

The above-described document reader may include a drive motor configured to generate a driving force to rotate a drive roller for the first roller pair and a driving roller for the second roller pair. Then, the control unit may control the drive motor, and a circumferential speed of the driving roller of the first roller pair may be slower than a circumferential speed of the driving roller of the second roller pair.

According to this configuration, after the rear end of the document medium passes through a nipping position of the second roller pair, a transport amount of the transportation by the first roller pair is small. Thus, reliability of the document medium holding operation using only the first roller pair to hold the document medium is improved.

The above-described document reader may include a printing function unit configured to print an image onto a print medium and to transport the print medium, and a detection unit configured to detect the document medium in a state in which the document medium holding operation is performed by the control unit.

According to this configuration, the control unit can control the printing function unit on the basis of an output by the detection unit capable of detecting the held document medium. Thus, the printing function unit can be controlled in accordance with the state of the document medium after the document medium holding operation has been performed.

The above-described document reader may have a configuration in which the control unit performs the printing by the printing function unit, when the detection unit does not detect the document medium.

According to this configuration, the control unit performs the printing by the printing function unit when the document medium held in the document medium holding operation has been removed by the user. Thus, it is possible to reduce the occurrence of a defect that may occur when the printing by the printing function unit is performed while the document medium is held.

The above-described document reader may have a configuration in which the control unit performs the printing of the image read from the document medium when the detection unit does not detect the document medium.

According to this configuration, when the control unit receives a copy request, the control unit performs the printing of the image of the document medium by the printing function unit when the document medium held in the document medium holding operation has been removed. Thus, while securing user convenience when a print request signal and a read request signal are input to the control unit separately, it is possible to reduce the occurrence of a defect that may occur when the control unit receives the copy request.

A control method is a control method of a document reader of a document reader including a reading unit configured to read an image of a document medium being transported, a printing function unit configured to print an image onto a print medium being transported, and a first roller pair configured to nip and transport the document medium downstream of the reading unit on a transport path along which the document medium is transported. The control method includes performing a document medium holding operation that stops rotation of the first roller pair in a state in which the document medium is not positioned in a read-enabling position of the reading portion and in a state in which the document medium is nipped by the first roller pair, and starting, after performing the document medium holding operation, printing onto the print medium by the printing function unit, when determination is made that the document medium is removed.

According to this configuration, the printing is performed by the printing function unit when the document medium held in the document medium holding operation has been removed by the user. Thus, it is possible to reduce the occurrence of a defect that may occur when the printing by the printing function unit is performed while the document medium is held.

What is claimed is:

1. A document reader reading an image of a document medium being transported and outputting image data, the document reader comprising:
   a reading unit configured to read the image of the document medium;
   a first roller pair configured to nip and transport the document medium downstream of a read-enabling position of the reading unit on a transport path along which the document medium is transported; and
   a control unit configured to control a rotation of the first roller pair, wherein
   the control unit stops, as a document medium holding operation, the rotation of the first roller pair in a state in which the document medium is not positioned in the read-enabling position of the reading unit and in a state in which the document medium is nipped by the first roller pair.

2. The document reader according to claim 1, wherein transport directions of the document medium at a nipping position of the first roller pair and at a downstream portion downstream of the nipping position on the transport path are directions that include a greater number of vertical direction components than horizontal direction components.

3. The document reader according to claim 1, comprising:
   a second roller pair configured to nip and transport the document medium downstream of the read-enabling position of the reading unit on the transport path, and upstream of the first roller pair on the transport path, wherein
   a nipping force of the first roller pair is smaller than a nipping force of the second roller pair.

4. The document reader according to claim 3, comprising a drive motor configured to generate a driving force to rotate a driving roller for the first roller pair and a driving roller for the second roller pair, wherein
   the control unit controls the drive motor, and
   a circumferential speed of the driving roller of the first roller pair is slower than a circumferential speed of the driving roller of the second roller pair.

5. The document reader according to claim 1, comprising:
   a printing function unit configured to print an image onto a print medium and to transport the print medium; and
   a detection unit configured to detect the document medium in a state in which the document medium holding operation is performed by the control unit, wherein
   the control unit is configured to control printing by the printing function unit.

6. The document reader according to claim 5, wherein
   the control unit performs the printing by the printing function unit when the detection unit does not detect the document medium.

7. The document reader according to claim 6, wherein the control unit performs printing of the image read from the document medium, when the detection unit does not detect the document medium.

8. A control method of a document reader including a reading unit configured to read an image of a document medium being transported, a printing function unit configured to print an image onto a print medium being transported, and a first roller pair configured to nip and transport the document medium downstream of the reading unit on a transport path along which the document medium is transported, the control method comprising;

performing a document medium holding operation that stops rotation of the first roller pair in a state in which the document medium is not positioned in a read-enabling position of the reading portion and in a state in which the document medium is nipped by the first roller pair; and starting, after performing the document medium holding operation, printing onto the print medium by the printing function unit, when determination is made that the document medium is removed.

* * * * *